United States Patent [19]
Kwon

[11] Patent Number: 6,092,135
[45] Date of Patent: Jul. 18, 2000

[54] SYSTEM FOR REDUCING BOOT TIME BY SELECTIVELY EXECUTING A PLUG AND PLAY ROUTINE ONLY AFTER COMPUTER CASES HAVE BEEN DISASSEMBLED

[75] Inventor: Eun-Sook Kwon, Seoul, Rep. of Korea

[73] Assignee: SamSung Electronics Co., Ltd., Suwon, Rep. of Korea

[21] Appl. No.: 09/074,017

[22] Filed: May 7, 1998

[30] Foreign Application Priority Data

May 7, 1997 [KR] Rep. of Korea ............... 97-17489
Apr. 15, 1998 [KR] Rep. of Korea ............... 98-13410

[51] Int. Cl.[7] .................................................. G06F 9/00
[52] U.S. Cl. ........................ 710/104; 710/8; 710/10; 710/11; 395/882
[58] Field of Search .......................... 395/830, 882; 710/10, 9, 104

[56] References Cited

U.S. PATENT DOCUMENTS

| | | | |
|---|---|---|---|
| 5,214,695 | 5/1993 | Arnold et al. | 384/4 |
| 5,375,210 | 12/1994 | Monnes et al. | 710/10 |
| 5,535,415 | 7/1996 | Kondou et al. | 710/8 |
| 5,559,965 | 9/1996 | Oztaskin et al. | 710/104 |
| 5,634,075 | 5/1997 | Smith et al. | 710/9 |
| 5,634,137 | 5/1997 | Merkin et al. | 710/10 |
| 5,704,035 | 12/1997 | Shipman | 714/42 |
| 5,844,214 | 12/1998 | Hoh | 219/723 |
| 5,903,778 | 5/1999 | Chang | 395/882 |

Primary Examiner—Katharina Schuster
Attorney, Agent, or Firm—Robert E. Bushnell, Esq.

[57] ABSTRACT

Disclosed is a computer system for reducing booting time. The computer system includes a sensor unit detecting whether a main body of the computer system is assembled or disassembled. The sensor unit outputs low and high signals when a bottom case of the main body is assembled and disassembled, respectively, from a top case of the main body. The computer system also includes a memory, a state of which is changed according to the signals output from the sensor unit, and which stores information of assembly and disassembly states of the main body, and a controller for selectively executing a specific program according to the state of the memory when power is supplied to the computer system.

26 Claims, 9 Drawing Sheets

SYSTEM FOR REDUCING BOOT TIME BY SELECTIVELY EXECUTING A PLUG AND PLAY ROUTINE ONLY AFTER COMPUTER CASES HAVE BEEN DISASSEMBLED

CLAIM OF PRIORITY

This application makes reference to, incorporates the same herein, and claims all benefits accruing under 35 U.S.C. §119 from applications entitled A Computer System For Reducing Booting Time And A Control Method Thereof earlier filed in the Korean Industrial Property Office on the 7th day of May 1997 and the 15th day of Apr. 1998, and there duly assigned Ser. No. 97-17489 and 98-13410 by that Office.

BACKGROUND OF THE INVENTION

1. Technical Field

The present invention relates to a computer system for reducing booting time and a control method thereof. More particularly, the present invention relates to a computer system and a method for controlling the same in which a plug and play operation is executed only after a main body of the computer system has been disassembled.

2. Related Art

Computer systems are information handling systems and are utilized by many individuals and businesses today. A conventional computer system can be defined as a microcomputer that includes a central processing unit (CPU), a volatile memory, a non-volatile memory, a display monitor, a keyboard, a mouse, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

A computer system typically performs a booting operation when power is supplied to the computer system. The booting operation initializes hardware mounted to the computer system and also loads the operating system.

There have been developed various devices and methods controlling aspects of the power-on and booting processes of computer systems. Examples of such devices and methods are disclosed in U.S. Pat. No. 5,214,695 for Apparatus and method for loading a system reference diskette image from a system partition in a personal computer system issued to Arnold et al., U.S. Pat. No. 5,704,035 for Computer method/apparatus for performing a basic input/output system (BIOS) power on test (POST) that uses three data patterns and variable granularity issued to Shipman, U.S. Pat. No. 5,634,137 for Method and apparatus for updating system configuration based on open/closed state of computer housing cover issued to Merkin et al., U.S. Pat. No. 5,559,965 for Input/output adapter cards having a plug and play compliant mode and an assigned resources mode issued to Oztaskin et al., U.S. Pat. No. 5,375,210 for Display mode query and set issued to Monnes et al, and U.S. Pat. No. 5,535,415 for Method for automatically setting the internal and external port configuration system issued to Kondou et al.

A conventional booting process of a conventional computer system shall now be described, using as an example a computer system having a Microsoft(R) Windows(R) operating system such as Windows 95. First, a user turns on a power switch to supply power to the computer system. Thereafter, under the control of a central processing unit (CPU), a basic input/output system (BIOS) executes a power on self test (POST) to test and initialize the computer system's components. The basic/input output system is software embedded on an integrated circuit located on the computer system's main board. The basic input/output system also handles low-level input/output to various peripheral devices connected to the computer system. The power on self test is the part of the basic input/output system that takes control immediately after the computer is turned on. The power on selftest initializes the computer hardware so that an operating system can be booted (loaded). When the power on self test procedure is finished, a plug and play operation is executed if it is determined that all hardware is operating normally. During the plug and play operation, the entire computer system is scanned for new hardware. An example of a plug and play operation is disclosed in U.S. Pat. No. 5,634,075 for Backward Compatibility for Plug and Play Systems issued to Smith et al. When the execution of the plug and play operation is completed, system files used by the Windows 95 operating system are executed to complete the booting process of the computer system.

Unfortunately, the conventional booting process can require a substantial amount of time, due in part to the time required for the basic input/output system routine and the power on self test, in addition to the plug and play operation. In the above booting operation of the conventional computer system, because the plug and play operation is performed every time the computer system is booted, regardless of whether any new hardware has been added to the computer system, the booting time can be unnecessarily lengthy. Also, in the above booting operation of the conventional computer system, because computer systems are used the vast majority of the time with the existing hardware configuration and not after installations of new hardware, the booting time is unnecessarily extensive.

Although presently there do exist systems which partially control the power on and booting processes of computer systems, I have discovered that it would be desirable to enhance the booting process of a computer system in order to reduce the time required.

SUMMARY OF THE INVENTION

It is an object of the present invention to provide a computer system which is capable of reducing booting time by omitting the plug and play operation from the booting process under certain circumstances.

It is another object of the present invention to provide a computer system which is capable of reducing booting time by performing a plug and play operation only after the main body of the computer system has been disassembled, in order to substantially overcome the limitations and disadvantages of the conventional art.

It is still another object of the present invention to provide a computer system capable of reducing booting time by not performing a plug and play operation, provided the main body of the computer system has remained assembled since the last time the plug and play operation has been performed, in order to substantially overcome the limitation and disadvantage of the conventional art.

To achieve the above objects and other objects, according to the principles of the present invention as embodied and broadly described herein, the present invention provides a computer system reducing booting time including disassembly sensing means outputting low and high signals when a bottom case of a main body is assembled and disassembled, respectively, from a top case of the same; a memory, a state of which is changed according to the low and high signals output from the disassembly sensing means, and which stores information of assembly and disassembly states of the main body; and a controller selectively executing a specific program according to the state of the memory when power is supplied to the computer system, the specific program being a plug and play program.

The disassembly sensing means comprises a light sensor mounted on a main board of the computer system and which operates to output a high signal in response to light being received when the bottom case of the main body is disassembled from the top case; and a microcomputer outputting a system management interrupt signal to the controller when a high signal is received from the light sensor.

The light sensor comprises a port transistor, a collector terminal of which is connected to a power source; a first inverter, an input terminal of which is connected to an emitter terminal of the port transistor; a second inverter, an input terminal of which is connected to an output terminal of the first inverter; and first and second resistors, the first resistor disposed between a connection to the microcomputer and an output terminal of the second inverter and the second resistor disposed between the connection to the microcomputer and the emitter terminal of the port transistor.

In another embodiment, the disassembly sensing means comprises a switch activator disposed on an inside surface of a front side of the top case, the switch activator projecting toward an inside of the main body; a push-button switch which is switched to ON and OFF states by engagement and disengagement, respectively, with the switch activator, the push-button switch being mounted on a front side of the bottom case and which is connected to a main board by a cable and it a connector; and a microcomputer transmitting a system management interrupt signal to the controller when it is detected that the push-button switch is in an OFF state.

In yet another embodiment, the disassembly sensing means comprises a switch activator disposed on an inside surface of a front side of the top case, the switch activator projecting toward an inside area of the main body; a push-button switch which is switched to ON and OFF states by engagement and disengagement, respectively, with the switch activator, the push-button switch being mounted on a main board of the computer system; and a microcomputer transmitting a system management interrupt signal to the controller when it is detected that the push-button switch is in an OFF state.

In still yet another embodiment, the disassembly sensing means comprises a photo module having a light illuminator and a light receptor, the photo module being mounted to a main board; a reflecting member disposed on an inside surface of a front side of the top case and acting to reflect infrared signals, emitted from the light illuminator of the photo module and passing through a hole formed on a front side of the bottom case, to the light receptor of the photo module; and a microcomputer receiving a low signal from the photo module when the light receptor of the same receives infrared signals emitted from the light illuminator and reflected off the reflecting member, and a high signal from the photo module when the light receptor does not receive the infrared signals, the microcomputer outputting a system management interrupt signal to the controller after receiving the high signal.

In still another embodiment, the disassembly sensing means comprises a photo module having a light illuminator and a light receptor, the photo module being mounted to a main board; a reflecting member disposed on an inner, upper surface of the top case and acting to reflect infrared signals, emitted from the light illuminator of the photo module, to the light receptor of the photo module; and a microcomputer receiving a low signal from the photo module when the light receptor of the same receives infrared signals emitted from the light illuminator and reflected off the reflecting member, and the microcomputer receiving a high signal from the photo module when the light receptor does not receive the infrared signals, the microcomputer outputting a system management interrupt signal to the controller after receiving the high signal.

Further, the present invention provides a booting method for a computer system including the steps of executing a power on self test (POST) when power is applied to the computer system; determining if a main body of the computer system has been disassembled by checking a state of a memory; and booting files for an operating system after selectively executing a specific program according to said determination of whether the main body of the computer system has been disassembled.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
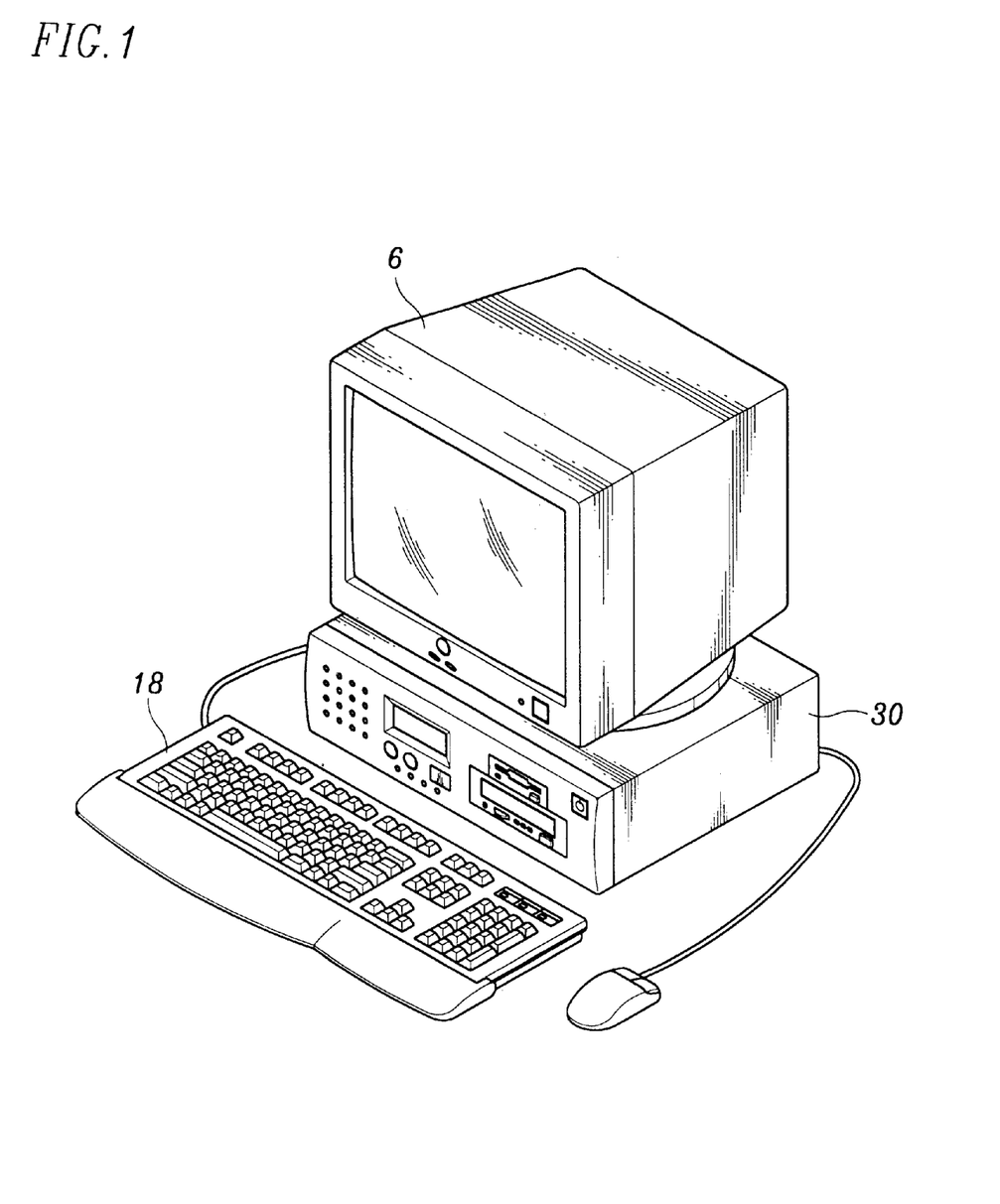
FIG. 1 is a perspective view of a conventional computer system.

Refer now to FIG. 1, which is a perspective view of a conventional computer system. A monitor 6 displays character and visual information. A keyboard 18 allows input. A main body of the computer system 30 includes a top case and a bottom case. A main board is mounted in the bottom case.

Figure 2:
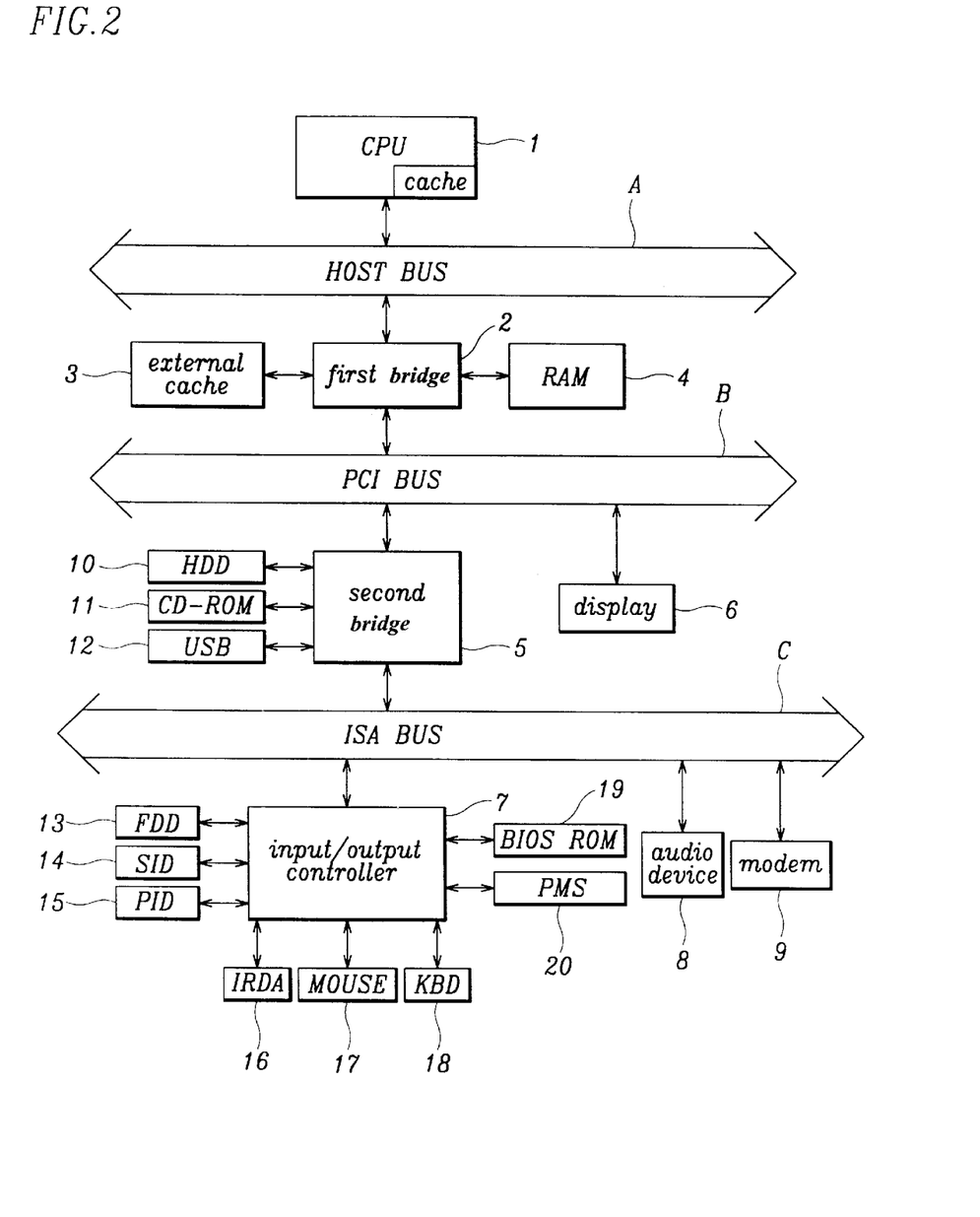
FIG. 2 is a block diagram of a conventional computer system.

Turn now to FIG. 2, which is a block diagram of a conventional computer system. The conventional computer system of FIG. 2 comprises a central processing unit (CPU) 1 having a cache installed therein, a first bridge 2, an external cache 3, and a random access memory (RAM) 4, all connected to a host bus A; a second bridge 5 and a display 6, both connected to a peripheral component interconnect (PCI) bus B; and an input/output controller 7, an audio device 8, and a modem 9, all connected to an industry standard architecture (ISA) bus C.

In FIG. 2, the external cache 3 and random access memory 4 are connected to the first bridge 2, and the first bridge 2 is also connected to the peripheral component interconnect (PCI) bus B. Further, a hard disk drive (HDD) 10, a compact disc-read only memory (CD-ROM) drive 11, and a universal serial bus (USB) 12 are connected to the second bridge 5, and the second bridge 5 is also connected to the industry standard architecture (ISA) bus C. Connected to the input/output controller 7 are the following: a floppy disk drive (FDD) 13, a serial input device (SID) serial port 14, a parallel input device (PID) parallel port 15, an Infrared Developers Association (IrDA) port 16, a mouse 17, a keyboard (KBD) 18, a basic input/output system read only memory (BIOS ROM) 19, and a power management system (PMS) 20.

The Infrared Developers Association (IrDA) is a group of representatives from computer-related companies. The Infrared Developers Association was formed to develop a standard set of specifications enabling a computer system to utilize infrared signals in lieu of cables in order to communicate with other computer systems and also with peripherals such as printers. On Jun. 30 1994 the IrDA approved the original specification known as IrDA Version 1.0. Since that time, additional specifications have been approved.

The random access memory (RAM) 4 is a memory that stores system software and user software loaded by the central processing unit (CPU) 1. The basic input/output system read only memory (BIOS ROM) 19 is a memory that stores specific programs to be executed by the central processing unit (CPU) 1.

With continued reference to FIG. 2, the display 6 provides character or visual information for a screen. The input/output controller 7 controls signal input/output operations of the various peripheral devices such as the floppy disk drive (FDD) 13, a device connected to the serial port 14, a device connected to the parallel port 15, and a device connected to the Infrared Developers Association (IrDA) port 16.

Figure 3:
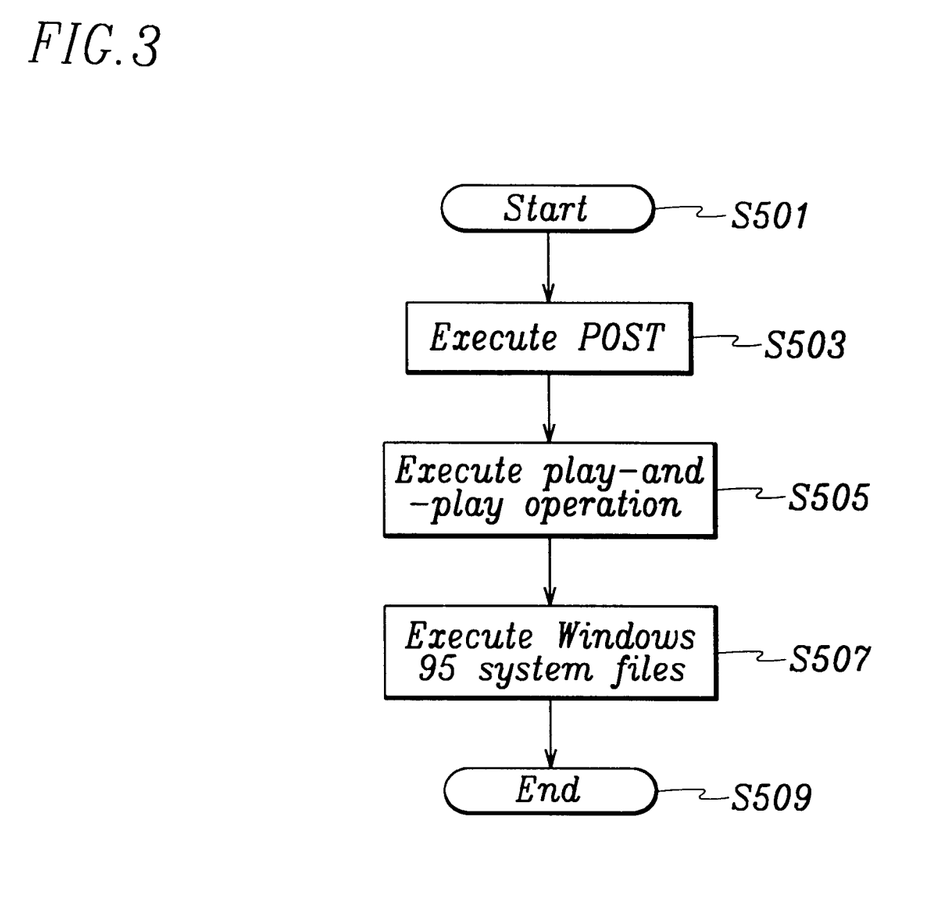
FIG. 3 is a flow chart of a conventional booting operation for a conventional computer system using Microsoft Windows 95 as the operating system.

Turn now to FIG. 3, which is a flow chart of a conventional booting operation for a conventional computer system using Microsoft Windows 95 as the operating system. At step S501, a user starts the booting process by turning on a power switch to supply power to the computer system. At step S503, a basic input/output system (BIOS) executes a power on self test (POST) to test and initialize the computer system's components. The basic/input output system is software embedded on an integrated circuit located on the computer system's main board. The basic input/output system also handles low-level input/output to various peripheral devices connected to the computer system. The power on self test is the part of the basic input/output system that takes control immediately after the computer is turned on. The power on selftest initializes the computer hardware so that an operating system can be booted (loaded). When the power on self test procedure is finished, a plug and play operation is executed if it is determined that all hardware is operating normally. During the plug and play operation, the entire computer system is scanned for new hardware.

At step S505 of FIG. 3, the plug and play operation is executed. The plug and play operation is executed every time that the conventional computer system is booted. Now the plug and play operation of FIG. 3 shall be described in detail. At first, a configuration manager, which manages the plug and play operation, checks to determine whether a bus is being used. That is, a bus enumerator, which is a special driver managing a bus, builds a database by gathering information on peripheral devices. Next, the configuration manager uses the database built by the bus enumerator to build a hardware tree structure and stores the hardware tree structure in a memory. The hardware tree structure indicates the composition of the hardware being used in the computer system.

Subsequently, the configuration manager operates drivers of each peripheral device indicated in the hardware tree structure. After the drivers of each peripheral device are operated, a resource arbitrator, which resolves conflicts among system resources, distributes system resources to each peripheral device. Here, system resources include interrupt request lines (IRQs), input/output port addresses, memory addresses, direct memory access (DMA) channels, et cetera.

Lastly, the configuration manager transmits information to the bus enumerator regarding details of the distribution of the system resources. The bus enumerator transmits information regarding allowed system resources to each peripheral device connected to the bus, thereby enabling the user to utilize the peripheral devices.

At step S507 of FIG. 3, when the execution of the plug and play operation is completed, system files used by the Windows 95 operating system are executed to complete the booting process of the computer system. At step S509, the booting process of the computer system is complete.

Unfortunately, the conventional booting process can require a substantial amount of time, due in part to the time required for the basic input/output system routine and the power on self test, in addition to the plug and play operation. In the above booting operation of the conventional computer system, because the plug and play operation is performed every time the computer system is booted, regardless of whether any new hardware has been added to the computer system, the booting time can be unnecessarily lengthy. Also, in the above booting operation of the conventional computer system, because computer systems are used the vast majority of the time with the existing hardware configuration and not after installations of new hardware, the booting time is unnecessarily extensive.

The present invention eliminates the plug and play operation in certain situations. The plug and play operation is omitted from the booting process if the main body of the computer system has not been disassembled since the most recent time the plug and play operation was executed. Also, the present invention shall only execute the plug and play operation when either of the following two situations exist. The first situation occurs when the main body of the computer system is currently disassembled. The second situation occurs when the main body of the computer system was disassembled and then reassembled, and the plug and play operation has not yet been executed since the reassembly of the main body of the computer system. I have discovered that the plug and play operation can be unnecessary when peripheral devices have not been newly added to the computer system.

Figure 4:
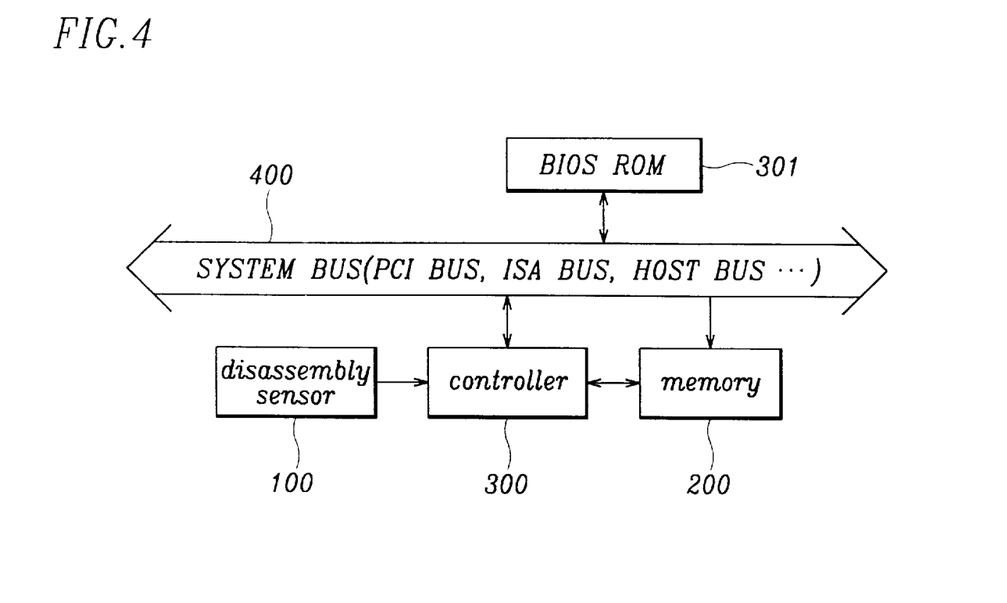
FIG. 4 is a block diagram of a computer system having a reduced booting time, according to the principles of the present invention.

Turn now to FIG. 4, which is a block diagram of a computer system having a reduced booting time, according to the principles of the present invention. The computer system comprises a disassembly sensor 100 detecting whether a main body of the computer system has been disassembled and outputting a corresponding interrupt signal; a memory 200 connected to a system bus 400 and storing information regarding the disassembly of the main body, a state of the memory 200 changing according to the interrupt signal output from the disassembly sensor 100; and a controller 300 performing an interrupt handler operation in a basic input/output system read only memory (BIOS ROM) if an interrupt signal has been input. The controller 300 performs a plug and play (PnP) operation if it is determined that the main body of the disassembled and then boots disassembled and then boots the computer system Alternatively, the controller 300 directly boots the computer system if it is determined that the main body of the computer system has not been disassembled.

It The above disassembly sensor 100 and memory 200 receive power from an external power source when the computer system is operating, and from an auxiliary battery (not shown) when the computer system is not operating. This auxiliary battery may be used by a real time clock (RTC) battery in the computer system. Accordingly, the disassembly sensor 100 is able to continuously detect disassembly of the main body of the computer system regardless of whether the disassembly sensor 100 is in an ON or OFF state. The state of the memory 200 is placed in a SET mode if the main body of the computer system has not been disassembled. The state of the memory 200 is placed in a RESET mode if the main body of the computer system has been disassembled. The above controller 300 will hereinafter be referred to as a central processing unit (CPU).

Figure 5:
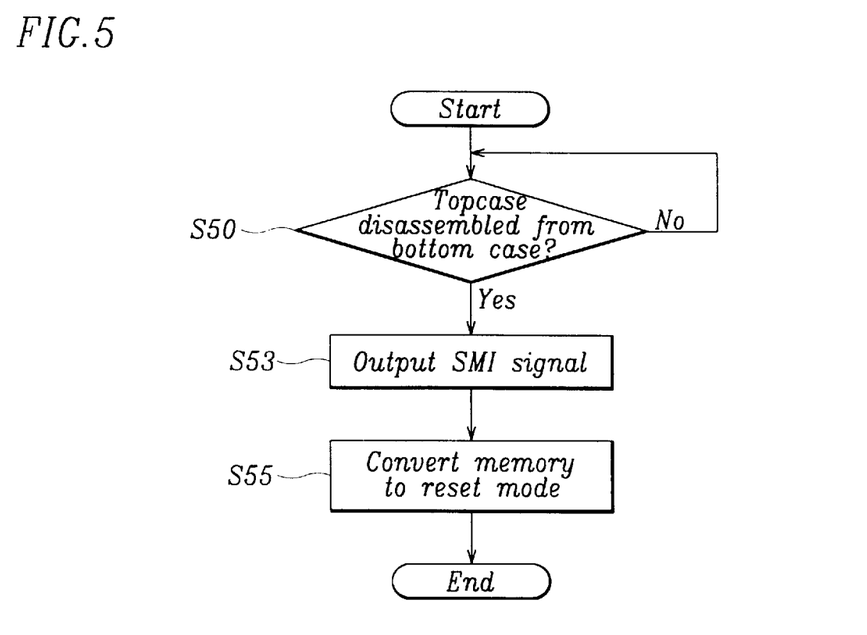
FIG. 5 is a flow chart of a method for detecting disassembly of a main body of a computer system, according to the principles of the present invention.

Refer now to FIG. 5, which is a flow chart of a method for detecting disassembly of a main body of a computer system, according to the principles of the present invention. At step S50, the disassembly sensor 100 determines if the top case has been disassembled from the bottom case of the main body of the computer system. At step S53, if the disassembly sensor 100 detects that the main body has been disassembled, the disassembly sensor 100 outputs a system management interrupt (SMI) signal.

At step S55, the central processing unit operates the interrupt handler stored in the basic input/output system read only memory (BIOS ROM) according to the input of the system management interrupt signal such that the memory 200 is converted to a RESET mode. That is, in step S55, the initial state of the memory 200 is changed from a SET mode, continuously used when no disassembly of the main body is detected, to a RESET mode by the interrupt handler.

Figure 6:
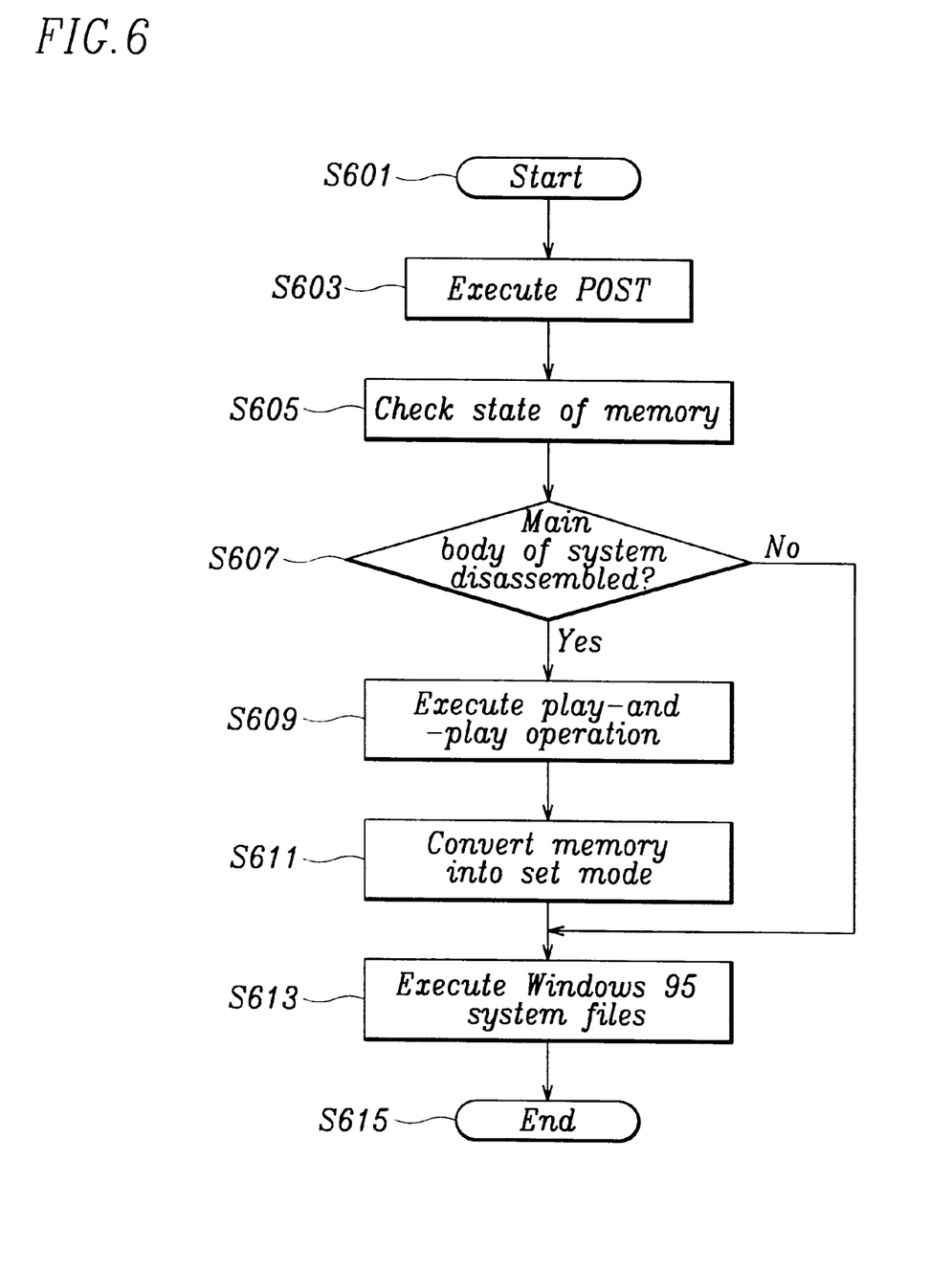
FIG. 6 is a flow chart of a booting operation for a computer system, according to the principles of the present invention.

Refer now to FIG. 6, which is a flow chart of a booting operation for a computer system, according to the principles of the present invention. At step S601, the user turns on a power switch in order to supply power to the computer system. At step S603, under the control of a central processing unit (CPU) 300, also known as the controller 300, a basic input/output system (BIOS) executes a power on self test (POST) to test and initialize the computer system's components. The basic/input output system is software embedded on an integrated circuit located on the computer system's main board. The basic input/output system also handles low-level input/output to various peripheral devices connected to the computer system. The power on self test is the part of the basic input/output system that takes control immediately after the computer is turned on. The power on self test initializes the computer hardware so that an operating system can be booted (loaded).

If it is determined during the power on self test that all hardware is operating normally, the central processing unit 300 determines if the memory 200 is in a RESET mode or a SET mode. At step S607, the central processing unit 300 determines whether the main body of the computer system has been disassembled according to whether the memory 200 is SET or RESET. The result of step S607 can be either YES (the main body of the computer system has been disassembled) or NO (the main body of the computer system has not been disassembled).

At step S607, if the central processing unit 300 detects that the memory 200 has been converted into a RESET mode by the interrupt handler, indicating that the main body of the computer system has been disassembled, then steps S609 and S61 will be performed. At step S609, if the memory 200 is in the RESET mode, the plug and play operation is executed. Then, at step S611, the memory 200 is converted to the SET mode.

However, at step S607, if the central processing unit 300 detects that the memory 200 has been converted into a SET mode by the interrupt handler, indicating that the main body of the computer system has not been disassembled, the central processing unit 300 does not perform step S609 and does not perform step S611.

At step S613, the central processing unit 300 executes all system files for an operating system, such as a Microsoft(R) Windows(R) operating system like Windows 95, or another operating system. At step S615, the booting operation of the computer system is complete.

A detailed description of the plug and play operation was previously provided during the discussion of FIG. 3, supra. Because the plug and play operation in step S609 of FIG. 6 is similar to the plug and play operation in step S505 of FIG. 3, a second detailed description of the plug and play operation has been deemed unnecessary.

Figure 7:
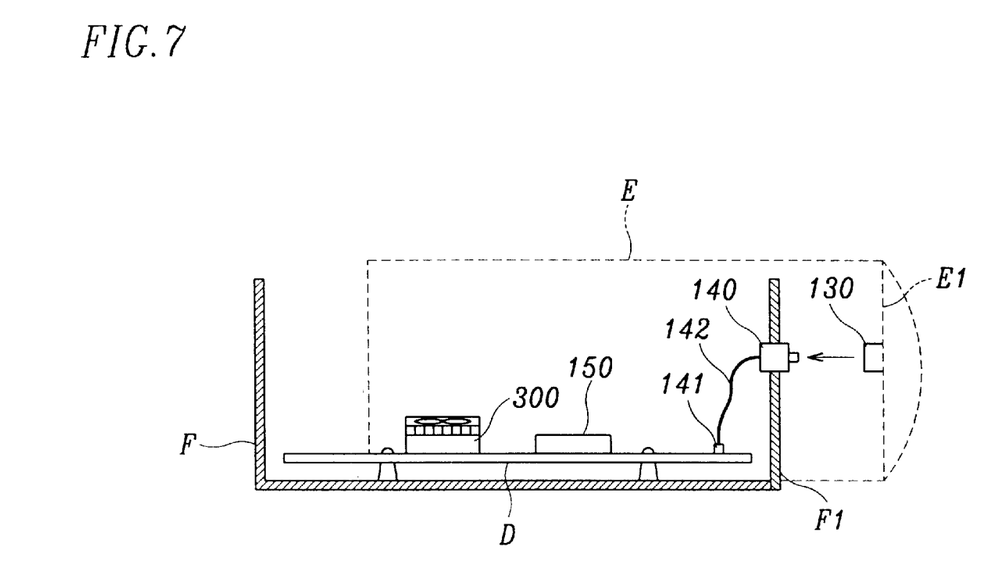
FIG. 7 is a side sectional view of a first preferred embodiment of a main body of a computer system in a partly disassembled state, according to the principles of the present invention.
Figure 8:
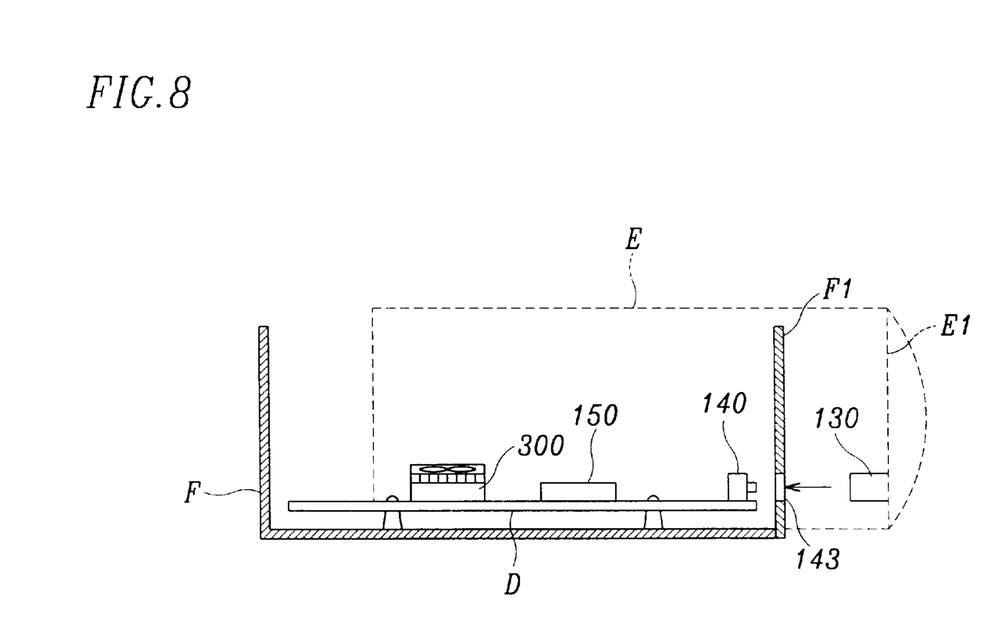
FIG. 8 is a side sectional view of a second preferred embodiment of a main body of a computer system in a partly disassembled state, according to the principles of the present invention.
Figure 9:
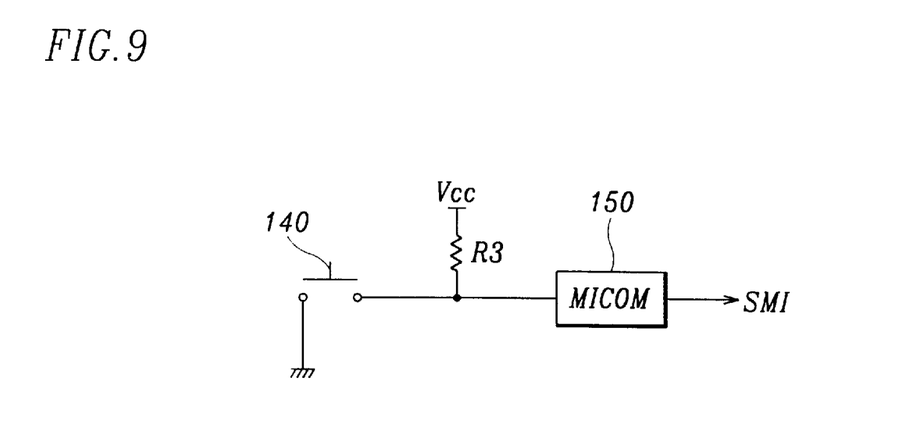
FIG. 9 is a circuit diagram of a sensor for detecting disassembly of the computer system corresponding to the first and second preferred embodiments of FIGS. 7 and 8, according to the principles of the present invention.

Turn now to FIGS. 7, 8, and 9 together. FIG. 7 is a side sectional view of a first preferred embodiment of a main computer system in a partly disassembled state, according to the principles of the present invention. FIG. 8 is a side sectional view of a second preferred embodiment of a main body of a computer system in a partly disassembled state, according to the principles of the present invention. FIG. 9 is a circuit diagram of a sensor for detecting disassembly of the computer system corresponding to the first and second preferred embodiments of FIGS. 7 and 8, according to the principles of the present invention.

In FIG. 9, a source voltage Vcc is applied to a resistor R3. The resistor R3 is connected to a push-button switch 140 and also to a microcomputer (MICOM) 150. The microcomputer 150 transmits a system management interrupt (SMI) signal.

FIGS. 7, 8, and 9 illustrate, inter alia, aspects of the disassembly sensor 100 of FIG. 4. As shown in FIG. 7, the disassembly sensor 100 comprises a switch activator 130 disposed on an inside surface of a front side E1 of a top case E. The switch activator 130 projects toward an inside area of the main body. A push-button switch 140 switches to ON and OFF states by the engagement and disengagement, respectively, with the switch activator 130. The push-button switch 140 is mounted on a front side F1 of a bottom case F. The push-button switch 140 is connected to a main board D by a cable 142 and a connector 141. A microcomputer 150 is connected to the push-button switch 140 through pull-up terminals Vcc and R3 (see FIG. 9). The microcomputer 150 transmits a system management interrupt (SMI) signal to the central processing unit 300 if the microcomputer 150 detects that the push-button switch 140 is in an OFF state.

With regard to the operation of the disassembly sensor 100 structured as described above, when the top and bottom cases E and F of the main body are fully assembled, the push-button switch 140 is engaged with the switch activator 130. When the push-button switch 140 is engaged with the switch activator 130, a low signal is input to the microcomputer 150. However, when the bottom case F is disassembled from the top case E, as the push-button switch 140 is disengaged from the switch activator 130, the push-button switch 140 is converted into an OFF state such that a high signal is input to the microcomputer 150. Accordingly, the microcomputer 150 outputs a system management interrupt signal to the central processing unit 300.

In FIG. 8, the push-button switch 140 is mounted directly on the main board D, and the switch activator 130 is provided on the inside surface of the front side E1 of the top case E. The switch activator 130 projects toward an inside of the main body as in the first embodiment of FIG. 7, but at a lower position corresponding to a height of the push-button switch 140. Further, a hole 143 is formed on the front side F1 of the bottom case F corresponding to positions of the push-button switch 140 and the switch activator 130 such switch active-button switch 140 is engaged with the switch activator 130 when the bottom case F is assembled to the top case E.

In FIG. 8, illustrating the second embodiment, the push-button switch 140 is connected to the microcomputer 150 similarly as in the first embodiment (see FIG. 9). Also, the operation of the disassembly sensor 100 of FIG. 8 corresponds to the operation of the disassembly sensor 100 of FIG. 7. That is, in FIGS. 7 and 8, the disassembly sensor 100 operates according to the engagement and disengagement of the push-button switch 140 with the switch activator 130. The operation of the central processing unit 300 of FIG. 8 is similar to the operation of the central processing unit 300 of FIG. 7.

Figure 10:
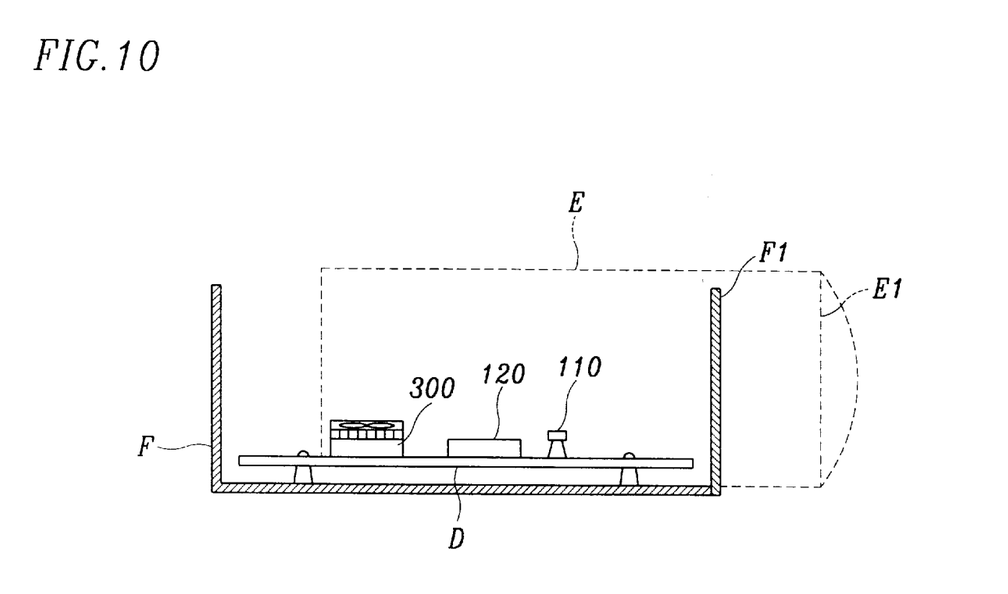
FIG. 10 is a side sectional view of a third preferred embodiment of a main body of a computer system in a partly disassembled state, according to the principles of the present invention.
Figure 11:
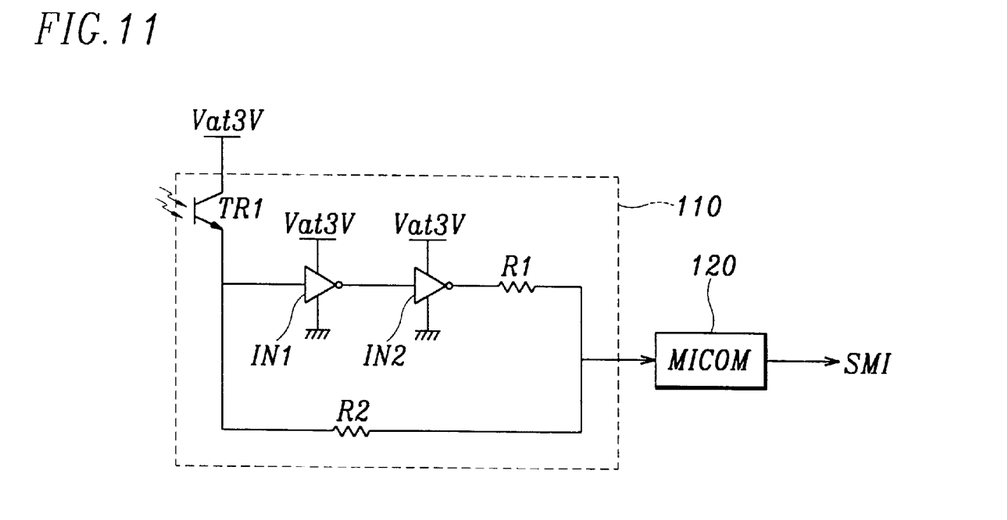
FIG. 11 is a circuit diagram of a sensor for detecting disassembly of the computer system corresponding to the third preferred embodiment of the present invention, according to the principles of the present invention.

Turn now to FIGS. 10 and 11 together. FIG. 10 is a side sectional view of a third preferred embodiment of a main body of a computer system in a partly disassembled state, according to the principles of the present invention. FIG. 11 is a circuit diagram of a sensor for detecting disassembly of the computer system corresponding to the third preferred embodiment of the present invention, according to the principles of the present invention.

FIG. 11 illustrates, inter alia, a circuit diagram of the disassembly sensor 100 of FIG. 4. In FIG. 10, the disassembly sensor 100 according to the third embodiment of the present invention comprises a light sensor 110 mounted to the main board D and which operates to output a high signal by the input of visible light received when the bottom case F of the main body is disassembled from the top case E, and a microcomputer 120 outputting a system management interrupt signal to the central processing unit 300 when a high signal is received from the light sensor 110. The bottom case F has a front side F1 and the top case E has a front side E1.

As shown in the circuit diagram of FIG. 11, the light sensor 110 includes a port transistor TR1. A collector terminal of port transistor TR1 is connected to a power source Vbat. A first inverter IN1 has an input terminal connected to an emitter terminal of the port transistor TR1. A if second inverter IN2 has an input terminal connected to an output terminal of the first inverter IN1. A first resistor R1 is disposed between an output terminal of the second inverter IN2 and a connection to a microcomputer (MICOM) 120. A second resistor R2 is disposed between the connection to the microcomputer 120 and the emitter terminal of the port transistor TR1.

With continued reference to FIGS. 10 and 11, the operation of the disassembly sensor 100 according to the third embodiment of the present invention will now be described. If the bottom case F is disassembled from the top case E, as visible light enters the main body of the computer system, the port transistor TR1 turns ON to output a high signal to the first inverter IN1. The high signal input to the first inverter IN1 passes through the second inverter IN2 to be received by the microcomputer 120. After the microcomputer 120 receives the signal from IN2 and then transmits a system management interrupt (SMI) signal to the central processing unit 300.

Figure 12:
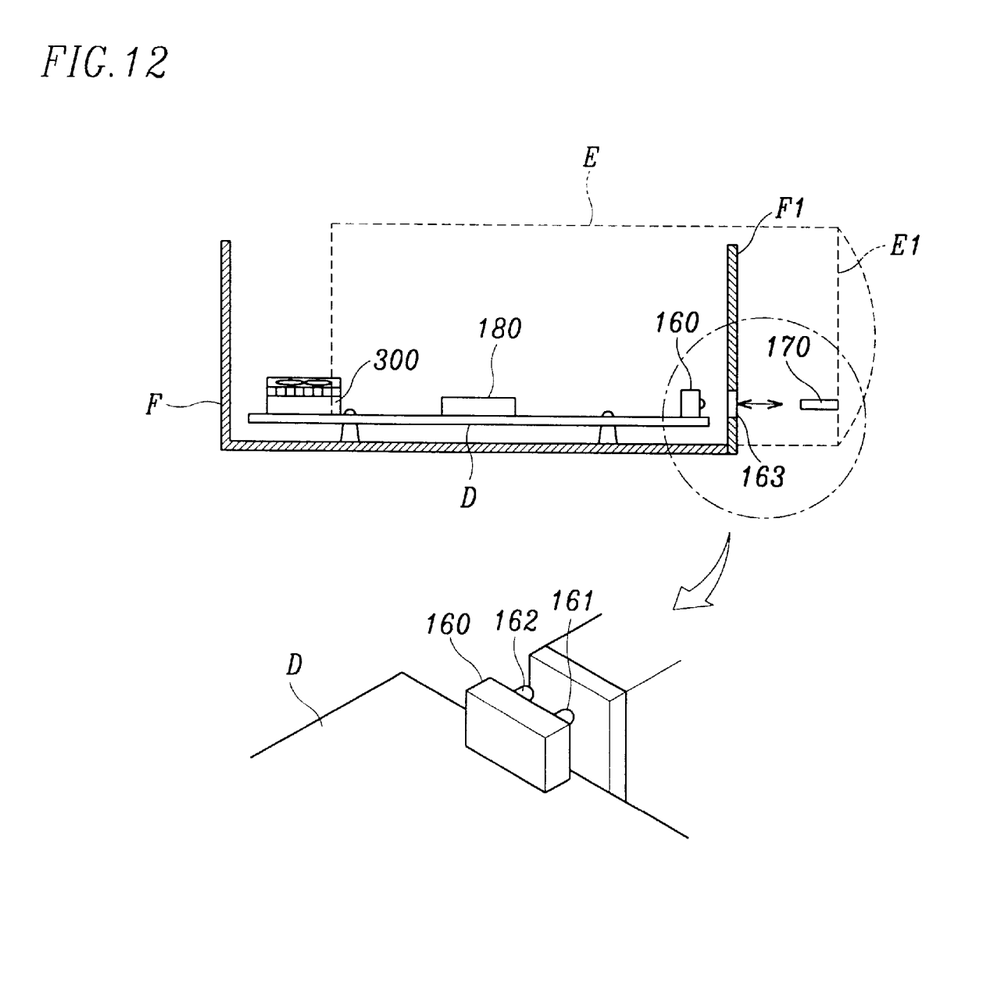
FIG. 12 is a side sectional view of a fourth preferred embodiment of a main body of a computer system in a partly disassembled state, according to the principles of the present invention.

Refer now to FIG. 12, which is a side sectional view of a fourth preferred embodiment of a main body of a computer system in a partly disassembled state, according to the principles of the present invention. As shown in the drawing, the disassembly sensor 100 according to the fourth embodiment comprises a photo module 160 having a light illuminator 161 and a light receptor 162. The photo module 160 is mounted to the main board D. A mirror 170 disposed on the inside surface of the front side E1 of the top case E and reflects infrared signals. The infrared signals are emitted from the light illuminator 161 of the photo module 160 and pass through a hole 163 formed on the front side F1 of the bottom case F. The infrared signals are received by the light receptor 162 of the photo module 160. A microcomputer 180 receives a low signal from the photo module 160 when the light receptor 162 receives infrared signals emitted from the light illuminator 161 and reflected off the mirror 170. The microcomputer 180 receives a high signal from the photo module 160 when the light receptor 162 does not receive the infrared signals. The microcomputer 180 outputs a system management interrupt (SMI) signal to the CPU 300 after receiving the high signal.

With continued reference to FIG. 12, the operation of the disassembly sensor 100 shall now be described, according to the fourth embodiment of the present invention. When the main body of the computer system is in an assembled condition, the following steps occur. Infrared signals are emitted from the light illuminator 161 of the photo module 160, reflected off the mirror 170, and received by the light receptor 162 of the photo module 160. As a result, a low signal is output from the photo module 160 to the microcomputer 180.

However, when the bottom case F of the main body is disassembled from the top case E of the main body, the following steps occur. Because a distance between the photo module 160 and the mirror 170 is increased due to the disassembly of the main body, the infrared signals emitted from the light illuminator 161 are no longer able to be reflected off the mirror 170 and back to the light receptor 162. As a result, the photo module 160 outputs a high signal to the microcomputer 180. When the high signal is received by the microcomputer 180, the microcomputer 180 responds by transmitting a system management interrupt signal to the central processing unit 300.

Figure 13:
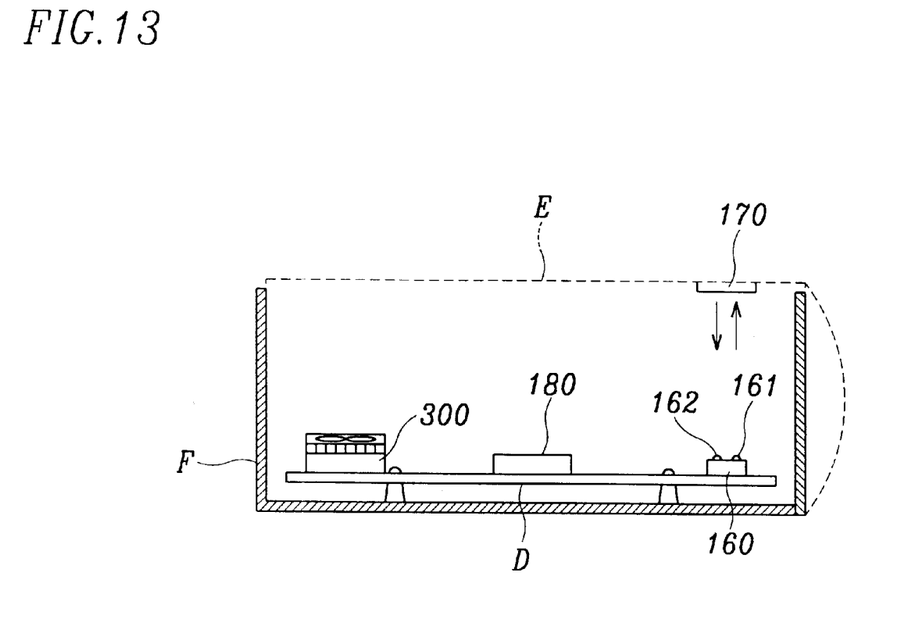
FIG. 13 is a side sectional view of a fifth embodiment of a main body of a computer system in an assembled state, according to the principles of the present invention.
Figure 14:
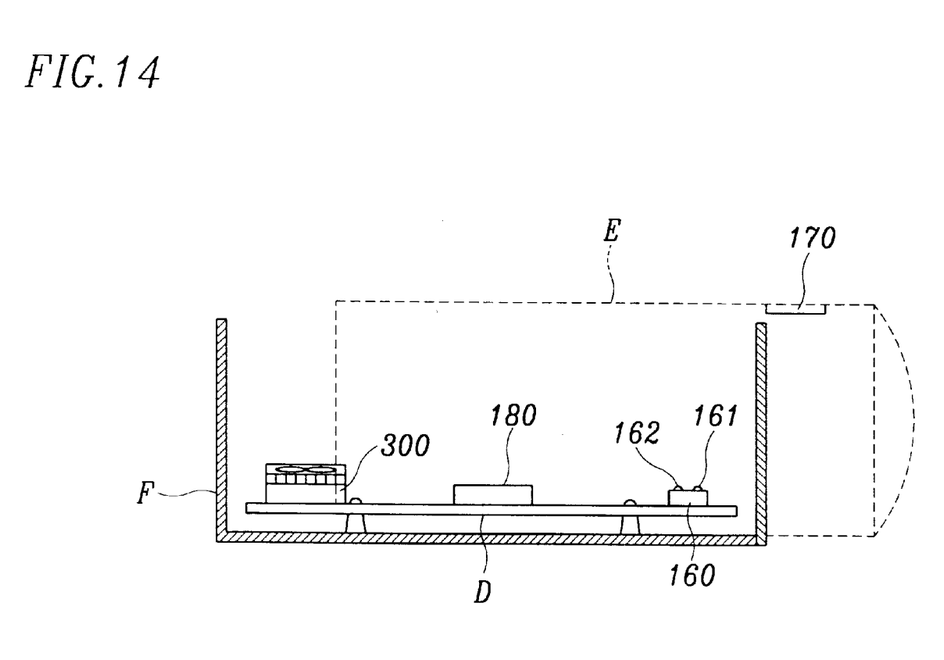
FIG. 14 is a side sectional view of the main body of the computer system shown in FIG. 13 in a partly disassembled state, according to the principles of the present invention.

Turn now to FIGS. 13 and 14 together. FIG. 13 is a side sectional view of a fifth embodiment of a main body of a computer system in an assembled state, according to the principles of the present invention. FIG. 14 is a side sectional view of the main body of the computer system shown in FIG. 13 in a partly disassembled state, according to the principles of the present invention.

As shown in FIGS. 13 and 14, only positions of the mirror 170 and photo module 160 are changed from the fourth embodiment depicted in FIG. 12. That is, the mirror 170 is mounted on an inner, upper surface of the top case E, while the photo module 160 is mounted on the main board D with the light illuminator 161 and the light receptor 162 facing toward the mirror 170.

In the fifth embodiment of FIG. 13, when the main body is in an assembled state as shown in FIG. 13, the light illuminator 161 emits infrared signals which are reflected off the mirror 170, then received by the light receptor 162. As a result, a low signal is output from the photo module 160 to the microcomputer 180.

However, when the bottom case F is disassembled from the top case E as shown in FIG. 14, as the photo module 160 is no longer aligned with the mirror 170, infrared signals emitted from the light illuminator 161 cannot be correctly reflected from the mirror 170 to the light receptor 162. As a result, the photo module 160 outputs a high signal to the microcomputer 180 and then, in response, the microcomputer transmits a system management interrupt signal to the central processing unit 300.

In the computer system and control method of the present invention structured and operating as in the above descriptions according to the principles of the present invention, because the plug and play operation is executed only after it has been detected that disassembly work has been performed on the computer, the booting time is greatly reduced when no new hardware has been added to the computer system. In other words, the present invention allows the time taken to boot the computer system to be reduced by performing a plug and play operation only when the main body of the computer system has been disassembled.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer apparatus, comprising:

a main body of the computer apparatus having a first case and a second case, the first case being assembled to the second case when said main body is assembled, and the first case being not assembled to the second case when said main body is not assembled;

a sensor unit sensing when said main body is assembled, sensing when said main body is not assembled, outputting a first signal when said main body is assembled, and outputting a second signal when said main body is not assembled;

a memory unit storing information pertaining to an assembly state of said main body, according to the first and second signals received from said sensor unit;

a plurality of peripheral units; and a controller unit selectively executing a routine according to the information stored by said memory unit, the routine being a plug and play routine gathering data describing said plurality of peripheral units, said controller unit selectively executing the routine when power is supplied to the computer apparatus, said controller unit being coupled to said plurality of peripheral units;

said sensor unit further comprising:

a sensor element selectively switching to one state among a first state and a second state, the first state corresponding to said main body being assembled, the second state corresponding to said main body being not assembled; and a microcomputer connected to said sensor element, said microcomputer transmitting a third signal to said controller unit when said sensor element switches to the second state.

2. The computer apparatus of claim 1, said controller unit not executing the routine when the information stored by said memory unit corresponds to said main body being assembled, and said controller unit executing the routine when the information stored by said memory unit corresponds to said main body being not assembled.

3. The computer apparatus of claim 1, wherein the first signal corresponds to a low signal and the second signal corresponds to a high signal.

4. The computer apparatus of claim 1, further comprising:

said sensor element corresponding to a light sensor, said light sensor switching to the second state and outputting the second signal when receiving light, and said light sensor switching to the first state and outputting the first signal when not receiving light;

said microcomputer outputting the third signal to said controller unit when receiving the second signal from said light sensor; and said light sensor receiving light when said main body is not assembled and said light sensor not receiving light when said main body is assembled.

5. The computer apparatus of claim 4, wherein the third signal corresponds to a system management interrupt signal.

6. The computer apparatus of claim 4, said light sensor being mounted on a printed circuit board of the computer apparatus.

7. The computer apparatus of claim 5, wherein said controller unit executes the routine when said controller unit receives said system management interrupt signal from said microcomputer.

8. The computer apparatus of claim 4, said light sensor further comprising:

a transistor having a control electrode, a first transistor electrode of a principal electrically conducting channel connected to a power source, and a second transistor electrode of the principal electrically conducting channel;

a first inverter having a first input electrode and a first output electrode, said first input electrode being connected to said second transistor electrode;

a second inverter having a second input electrode and a second output electrode, said second input electrode being connected to said first output electrode;

a first resistor having a first resistor terminal connected to a first terminal of said microcomputer and a second resistor terminal connected to said second output electrode; and a second resistor having a first resistor electrode connected to said first terminal of said microcomputer and having a second resistor electrode connected to said second transistor electrode.

9. The computer apparatus of claim 8, wherein said transistor switches on when said control electrode of said transistor receives a first quantity of light, and switches off when said control electrode of said transistor does not receive said first quantity of light, said first quantity of light only being received when said main body is not assembled.

10. The computer apparatus of claim 9, wherein said light sensor outputs the first signal when said transistor switches off, and said light sensor outputs the second signal when said transistor switches on.

11. The computer apparatus of claim 2, further comprising:

said sensor element further comprising:
an activator unit mounted on the second case; and
a switch unit switching to the first state when engaging said activator unit, said switch unit switching to the second state when not engaging said activator unit, said switch unit being mounted on the first case;

said microcomputer connected to said switch unit, said microcomputer transmitting the third signal to said controller unit when said switch unit switches to the second state.

12. The computer apparatus of claim 11, said activator unit being mounted on an inside surface of a first side of the second case and positioned to project toward an inside area of said main body, said switch unit being mounted on a first side of the first case, and said switch unit being connected to a cable attached to a printed circuit board of the computer apparatus.

13. The computer apparatus of claim 11, said switch unit engaging said activator unit when said main body is assembled, and said switch unit not engaging said activator unit when said main body is not assembled.

14. The computer apparatus of claim 11, wherein said controller unit corresponds to a central processing unit.

15. A computer apparatus, comprising:

a main body of the computer apparatus having a first case and a second case, the first case being assembled to the second case when said main body is assembled, and the first case being not assembled to the second case when said main body is not assembled;

a sensor unit sensing when said main body is assembled, sensing when said main body is not assembled, outputting a first signal when said main body is assembled, and outputting a second signal when said main body is not assembled;

a memory unit storing information pertaining to an assembly state of said main body, according to the first and second signals received from said sensor unit;

at least one peripheral unit; and a controller unit executing a routine gathering data describing said at least one peripheral unit when the information stored by said memory unit corresponds to said main body being not assembled, said controller unit not executing the routine when the information stored by said memory unit corresponds to said main body being assembled;

said sensor unit further comprising:
a sensor element selectively switching to one state among a first state and a second state, the first state corresponding to said main body being assembled, the second state corresponding to said main body being not assembled; and
a microcomputer connected to said sensor element, said microcomputer transmitting a third signal to said controller unit when said sensor element switches to the second state.

16. The computer apparatus of claim 15, said sensor unit further comprising:

said sensor element further comprising:
an activator unit mounted on the second case; and
a switch unit switching to the first state when engaging said activator unit and switching to the second state when not engaging said activator unit, said switch unit being mounted directly onto a printed circuit board connected to the first case;

said microcomputer connected to said switch unit, said microcomputer transmitting the third signal to said controller unit when said switch unit switches to the second state.

17. The computer apparatus of claim 16, said activator unit being mounted on outside surface of a first side of the second case and positioned to project toward an inside area of said main body.

18. The computer apparatus of claim 15, further comprising:

said sensor element further comprising;
a light unit connected to the first case of said main body;
a light transmitter connected to said light unit and transmitting electromagnetic radiation;
a light receiver connected to said light unit and receiving the electromagnetic radiation; and
a light reflecting unit reflecting to said light receiver the electromagnetic radiation transmitted from said light transmitter when the second case is assembled to the first case, said light reflecting unit not reflecting to said light receiver the electromagnetic radiation transmitted from said light transmitter when the second case is not assembled to the first case, said light reflecting unit being connected to the second case, said light receiver switching to the first state when the electromagnetic radiation is received from said light reflecting unit, said light receiver switching to the second state when the electromagnetic radiation is not received from said light reflecting unit;

said microcomputer receiving a first signal from said light unit when said light receiver receives the electromagnetic radiation, receiving a second signal from said light unit when said light receiver does not receive the electromagnetic radiation, and outputting the third signal to said controller unit when receiving the second signal.

19. The computer apparatus of claim 18, said light unit being mounted on a printed circuit board connected to the first case, said light reflecting unit being mounted on an inside surface of a first side of the second case, and the electromagnetic radiation being transmitted from said light transmitter through an aperture formed in a first side of the first case to said light reflecting unit.

20. The computer apparatus of claim 18, whereas the electromagnetic radiation corresponds to light in the wavelength range of infrared light.

21. A booting method for a computer system, comprising the steps of:

supplying power to the computer system;

executing a first routine testing and initializing electronic components of the computer system;

sensing when a main body of the computer system has been disassembled, said sensing being performed by a sensor unit;

transmitting a control signal from a microcomputer coupled with said sensor unit when said sensor senses that said main body has been disassembled;

recording first data in a first memory unit when sensor unit senses that said main body has been disassembled in accordance with said control signal, not recording said first data in said first memory when said main body has not been disassembled;

identifying said first data stored in said first memory unit;

determining whether a main body of the computer system has been disassembled, according to said first data;

selectively executing a second routine according to said determining step, said second routine gathering second data describing a plurality of peripheral devices connected to the computer system; and executing a third routine to load third data to a second memory unit of the computer system.

22. The booting method of claim 21, said first routine corresponding to a power on self test routine and said second routine corresponding to a plug and play routine.

23. The booting method of claim 21, said third data corresponding to operating system data.

24. The booting method of claim 21, said main body further comprising a first case and a second case, the first case being assembled to the second case when said main body is assembled, and the first case being disassembled from the second case when said main body is disassembled.

25. The booting method of claim 24, said second routine being executed when said determining step determines that said main body has been disassembled, and said second routine not being executed when said determining step determines that said main body has not been disassembled.

26. A computer system, comprising:

a main body having a first case and a second case;

a board;

a sensor unit sensing when said first and second cases are disassembled, outputting an output signal when said first and second cases are disassembled;

a microcomputer being coupled with said sensor unit, said microcomputer transmitting a control signal when said microcomputer receives said output signal from said sensor unit; and a controller unit selectively controlling said computer system responsive to said control signal output from said microcomputer;

said sensor unit being mounted on said board, said sensor unit receiving power from a battery mounted on said board, said sensor unit being located at a position where external light is incident when said first and second cases are open.

\* \* \* \* \*